United States Patent [19]
Konno et al.

[11] Patent Number: 5,860,523
[45] Date of Patent: Jan. 19, 1999

[54] TAPE CASSETTE RECEIVING HOUSING

[75] Inventors: Toshikazu Konno; Hiroshi Ozaki; Kiyoshi Urayama; Takashi Ota; Seiji Nihei; Taizo Fukuda; Takayasu Hirano; Osamu Koizumi, all of Miyagi, Japan

[73] Assignee: Sony Corporation, Japan

[21] Appl. No.: 374,551

[22] PCT Filed: Jun. 3, 1994

[86] PCT No.: PCT/JP94/00898

§ 371 Date: May 11, 1995

§ 102(e) Date: May 11, 1995

[87] PCT Pub. No.: WO94/29194

PCT Pub. Date: Dec. 22, 1994

[30] Foreign Application Priority Data

| Jun. 3, 1993 | [JP] | Japan | 5-133248 |
| Oct. 8, 1993 | [JP] | Japan | 5-253456 |

[51] Int. Cl.⁶ ............................................. B65D 85/672
[52] U.S. Cl. ................................ 206/387.13; 206/493
[58] Field of Search ............................ 206/387.1, 232, 206/472, 387.13, 387.14, 493

[56] References Cited

U.S. PATENT DOCUMENTS

| 3,587,841 | 6/1971 | Devejian | 206/387.1 |
| 3,917,067 | 11/1975 | Brown et al. | 206/387.1 |
| 3,994,551 | 11/1976 | Ackeret | 206/387.1 X |
| 3,998,324 | 12/1976 | Roccaforte | 206/387.1 |
| 4,593,814 | 6/1986 | Hagiwara et al. | 206/387.1 |
| 4,614,269 | 9/1986 | Dietze et al. | 206/387.1 |

FOREIGN PATENT DOCUMENTS

| 5040581 | 12/1969 | Japan. |
| 49-118314 | 10/1974 | Japan. |
| 50-86118 | 7/1975 | Japan. |
| 58-24299 | 5/1983 | Japan. |
| 58-50550 | 11/1983 | Japan. |
| 59-82671 | 5/1984 | Japan. |
| 59-157276 | 10/1984 | Japan. |
| 61-200375 | 12/1986 | Japan. |
| 293277 | 7/1990 | Japan. |
| 4173576 | 6/1992 | Japan. |
| 4106286 | 9/1992 | Japan. |
| 4253676 | 9/1992 | Japan. |
| 516988 | 1/1993 | Japan. |

*Primary Examiner*—Jacob K. Ackun
*Attorney, Agent, or Firm*—Ronald P. Kananen

[57] ABSTRACT

A tape cassette receiving housing comprises a housing proper portion and a lid portion which is fixed to the housing proper portion through a hinge portion so as to enable to be opened or closed. Shaft portions are formed so as to penetrate into reel driving holes of a supply reel and a take-up reel of a tape cassette received in the housing proper portion. Elastic bodies are attached to outer peripheries of the shaft portions, and the elastic bodies are brought into contact with inner peripheral surfaces of reel driving holes. According to the above construction, a tape cassette is fixed in the tape cassette receiving housing so as not to incline the tape cassette and not to rotate the supply reel and the take-up reel.

5 Claims, 17 Drawing Sheets

TAPE CASSETTE RECEIVING HOUSING

FIELD OF THE INVENTION

The present invention relates to a tape cassette receiving housing (it is also called a tape cassette carrying housing) which is used for storing or carrying a large-sized heavy tape cassette such as a digital video tape cassette or a digital data tape cassette that is used in a broadcasting station, and in particular to one which can prevent as much as possible the received cassette from moving in an axial direction of a positioning shaft portion formed in the housing and a reel from rotating by an impact upon falling in such a case that the tape cassette receiving housing has been dropped by mistake.

BACKGROUND OF THE INVENTION

Tape cassettes for business use are enlarged in size for improving the picture quality and for extending the recording time. For example, a tape cassette for digital recording and playback may have external dimensions of a lateral width of 366 mm, a longitudinal width of 206 mm and a thickness of 33 mm. Its weight is also extremely heavy.

As a tape cassette receiving housing for receiving a tape cassette for business use as the above, one shown in FIG. 22 is known.

FIG. 22 is a perspective view of a conventional tape cassette receiving housing 101.

The tape cassette receiving housing 101 is equipped with a housing proper portion 102 for receiving a tape cassette such as a digital video tape cassette, a lid portion 103 for opening or closing an opening portion of the housing proper portion 102, and a pair of positioning shaft portions (engaging projection portions) 104, 105 formed on an upper surface of the housing proper portion 102.

The shaft portions 104, 105 are cylindrically formed so as to be smaller in diameter than reel driving holes 114, 115 of a supply reel 112 and a take-up reel 113 of the tape cassette 111. 116 . . . 116 are gear-like driving ribs constituting the reel driving holes 114, 115.

When the tape cassette 111 is inserted into the housing proper portion 102, as shown in FIG. 20, the shaft portions 104, 105 penetrate into the reel driving holes 114, 115 of the supply reel 112 and the take-up reel 113 of the tape cassette 111, 115 and limit the movement of the tape cassette 111, thereby protecting the tape cassette from the impact upon falling or the like.

Furthermore, FIG. 23 is a sectional view of a condition in which the tape cassette 111 is received in the tape cassette receiving housing 101. In FIG. 23, 117 is a magnetic tape, 118 and 119 are upper and lower flanges of the supply reel 112 and the take-up reel 113. 120 and 121 are upper and lower shells of the tape cassette 111. 122 is a reel holder attached to the upper shell 120. 123 is a reel spring. 124 is a reel plate.

FIG. 24 is a sectional view showing an interior of the tape cassette 111.

In FIG. 24, 125 is a leader tape, and an end portion of the leader tape 125 is clamped by a clamper 126 of the take-up reel side, between the clamper 126 and a clamper-attaching portion 128 formed on a shaft portion 127 of the take-up reel 113. 131 and 132 are first and second ratchet mechanisms placed on the outer sides of flanges of the supply reel 112 and the take-up reel 112.

The first ratchet mechanism 131 comprises a ratchet tooth 135 formed on an outer periphery of the flange of the supply reel 112 and a ratchet pawl 134 which is to be meshed with the ratchet tooth 133.

Furthermore, the second ratchet mechanism 132 comprises a ratchet tooth 135 formed on an outer periphery of the flange of the take-up reel 113 and a ratchet pawl 136 which is to be meshed with the ratchet tooth 135.

Furthermore, as shown in FIG. 22, when the lid is in a closed condition, the ratchet pawl 134 of the first ratchet mechanism 131 is engaged with the ratchet tooth 133 formed on the supply reel 112, thereby preventing the supply reel 112 from rotating in a tape delivery direction (a clockwise direction in FIG. 24).

On the other hand, the ratchet pawl 136 of the second ratchet mechanism 132 is engaged with the ratchet tooth 135 formed on the take-up reel 113, thereby preventing the take-up reel 113 from rotating in a tape delivery direction (a counter-clockwise direction in FIG. 24).

The above conventional tape cassette receiving housing has the following problems.

(1) When an impact force in a direction (hereinafter referred to as a lateral direction) perpendicular to the axial direction (axial direction of the shaft portions 104, 105) is added by an impact upon falling or the like, the shaft portions 104, 105 function effectively so as to suppress the movement of the supply reel 112 or the take-up reel 113 in the lateral direction. However, when an impact force in the axial direction (referred to as a longitudinal direction) is added, the shaft portions 104, 105 hardly function. Thus, the supply reel 112 or the take-up reel 113 moves in the longitudinal direction in a manner to come off the shaft portions 104, 105.

(2) When the supply reel 112 or the take-up reel 113 is in an inclined condition as shown in FIG. 25 and moves in the longitudinal direction by the addition of an impact force in the longitudinal direction, end portions of the upper and lower flanges 118, 119 of the supply reel 112 or the take-up reel 113 are brought into abutment with the upper and lower shells 120, 121. With this, the end portions of the upper and lower flanges 118, 119 are deformed, thereby damaging tape edges of the magnetic tape 117 positioned at the end portions.

(3) When a force in a rotational direction is added to the supply reel 112 and the take-up reel 113 by the vibration upon the product transportation or the like, the end portion of the leader tape 125 may have slipped off from a space between the clamper-attaching portion 128 formed on the shaft portion 127 of the take-up reel 113 and the clamper 126 attached to the attaching portion 128.

The reason will be explained as follows.

The supply reel 112 and the take-up reel 113 try to alternately rotate in a tape delivery direction and a tape take-up direction by the vibration upon the production transportation.

However, as is mentioned hereinabove, the supply reel 112 and the take-up reel 113 are prevented by the first and second ratchet mechanisms 131, 132 from rotating in the tape delivery direction and permitted to rotate only in the tape take-up direction.

By the way, upon shipping of the product, the magnetic tape is scarcely wound around the take-up reel 113, and, in contrast, it is fully wound around the supply reel 112. Therefore, a difference will occur in moment of inertia, between the take-up reel 113 and the supply reel 112, and a force to rotate in the tape take-up direction of the supply reel 112 is far greater than a force to rotate in the tape take-up direction of the take-up reel 113.

By the way, as is mentioned hereinabove, the rotation in the tape delivery direction of the tape take-up reel 113 is suppressed by the second ratchet mechanism 132.

Therefore, the leader tape 125 of which end portion is clamped by the clamper 126 to the take-up reel 113 is intermittently pulled by the supply reel 112.

With this, for example, the end portion of the leader tape 125 relatively easily comes off the space between the clamper-attaching portion 128 and the clamper 126, in relation to a distance for clamping the leader tape or the like between the clamper-attaching portion of the shaft portion 127 of the take-up reel 113 and the clamper 126 attached to the attaching portion 128.

Furthermore, as is mentioned hereinabove, the supply reel 112 and the take-up reel 113 are to be rotated only in the tape take-up direction by the first and second ratchet mechanisms 131, 132. Therefore, the inner diameter side of the magnetic tape 117 which is wound about the supply reel 112 is pulled to the tape take-up side, and the outer diameter side moves in the tape delivery direction by the rotation of the take-up reel 113.

Therefore, a so-called cinching will occur at a position where the balance of the tape winding pressure is bad.

SUMMARY OF THE INVENTION

The present invention aims to provide a tape cassette receiving housing which solves the above conventional problems by suppressing the movement of a tape cassette in a housing and the rotations of a supply reel and a take-up reel and which enables it to sufficiently produce a protective effect against an impact in the longitudinal direction as well as an impact in the lateral direction.

According to a first embodiment, in a tape cassette receiving housing which is equipped with a housing proper portion for receiving a tape cassette, a lid portion for opening or closing an opening portion of the housing proper portion and shaft portions which penetrate into reel driving holes of the tape cassette received in the housing proper portion, elastic bodies are formed on the shaft portions, which elastic bodies are brought into a close contact with inner peripheral surfaces of the reel driving holes when the shaft portions are inserted into the reel driving holes.

A tape cassette receiving housing according to the first invention has the above-mentioned constitution. Therefore, when a tape cassette is received in the housing proper portion, the shaft portions penetrate into the reel driving holes of the tape cassette, and the outer periphery of the elastic body formed on the shaft portion is brought into a close contact with the inner peripheral surface of the reel driving hole, thereby suppressing the movement of a tape cartridge in an axial direction.

Therefore, even when, for example, the tape cassette receiving housing is dropped by mistake and thereby an impact force is added to a tape cassette in an axial direction, as shown in FIG. 25, end portions of upper and lower flanges of a supply reel and a take-up reel can be previously prevented from impacting against upper and lower shells by the movement of the tape cassette in the axial direction, thereby the end portions of the upper and lower flanges can be previously prevented from deforming, and thereby tape edges of a magnetic tape which are positioned at the end portions can be previously prevented from receiving damage.

Furthermore, the rotation of the supply reel and the take-up reel is suppressed by the elastic body. Therefore, an end portion of a leader tape can be prevented from coming off a clamper.

Furthermore, the supply reel and the take-up reel are prevented from rotating in the tape take-up direction as well as in the tape delivery direction (the rotation in the tape take-up direction is not prevented by the conventional ratchet mechanism). Therefore, it is impossible that an inner diameter side and an outer diameter side of a magnetic tape wound around the supply reel are pulled in opposite directions and that thereby a balance of the tape winding pressure becomes lost. With this, the occurrence of cinching caused by the lost balance of the tape winding pressure can be prevented.

Furthermore, upon falling or the like, in case that an impact force is added to a tape cassette in a direction (lateral direction) perpendicular to the axial direction, the elastic body acts as a shock absorber, thereby protecting the supply reel and the take-up reel against an impact.

According to a second embodiment, in a tape cassette receiving housing which is equipped with a housing proper portion for receiving a tape cassette, a lid portion for opening or closing an opening portion of the housing proper portion and shaft portions which penetrate into reel driving holes of the tape cassette received in the housing proper portion, a cassette pressing member for pressing an upper shell or a lower shell of a tape cassette received in the housing proper portion against an inner surface of the housing proper portion or the lid portion is formed.

A tape cassette receiving housing according to the second invention has the above-mentioned constitution. Therefore, the upper shell or the lower shell of a tape cassette is pressed by the cassette pressing member against an inner surface of the housing proper portion or the lid portion, thereby suppressing the movement of a tape cassette in the axial direction.

Therefore, a tape cassette can be protected against an impact in the axial direction upon falling.

According to a third embodiment, in a tape cassette receiving housing of the second embodiment, the cassette pressing member comprises a reel holder pressing member which is projectingly formed on an inner surface of the lid portion and pushes down a reel holder of a tape cassette in a condition that the lid portion is closed.

A tape cassette receiving housing of the third invention has the above-mentioned constitution. Therefore, when the lid portion is closed, the reel holder is pressed by the reel holder pressing member formed on an inner surface of the lid portion as the cassette pressing member, and thus the reel and the lower shell are pressed by the reel holder against an inner surface of the housing proper portion.

Therefore, a tape cassette is prevented from moving in the axial direction, and thus the tape cassette is protected against an impact in the axial direction upon falling.

According to a fourth embodiment, in a tape cassette receiving housing of the third embodiment, the reel holder pressing member is formed by an elastic body.

According to a tape cassette receiving housing of the fourth invention, the reel holder pressing member is formed by an elastic body. Therefore, when the reel holder collides with the reel holder pressing member with a pressure of at least a predetermined value by an impact upon falling or the like, the reel holder pressing member is elastically deformed.

Therefore, the impact is absorbed by the deformation, thereby protecting the reel holder.

According to a fifth embodiment, in the second tape cassette receiving housing, the cassette pressing member comprises a sucker which is formed on the housing proper portion and sucks a tape cassette received in the housing proper portion toward the housing proper portion side.

According to a tape cassette receiving housing of the fifth embodiment, when a tape cassette is received in the housing proper, the tape cassette is adhered to and sucked by the sucker formed on the housing proper portion, thereby pressing the lower shell of the tape cassette against an inner surface of the housing proper portion.

Therefore, the tape cassette is prevented from moving in the axial direction, and thus the tape cassette is protected against an impact upon falling or the like.

According to a sixth embodiment, in a tape cassette receiving housing of the second invention, the cassette pressing member comprises a seating portion for placing a reel thereon, which is projectingly formed on an inner surface of the housing proper portion and lifts up a reel or a reel holder of a tape cassette received in the housing proper portion to thereby press the reel holder against an inner surface of the lid portion.

According to a tape cassette receiving housing of the sixth invention, when a tape cassette is received in the housing proper portion, the supply reel and the take-up reel are placed on the seating portion, thus they are lifted up by the seating portion to the upper shell side, thus the reel holder, is raised, and thus a head portion of the reel holder is pressed against an inner surface of the lid portion.

Therefore, the tape cassette takes a fixed condition between the seating portion and the inner surface of the lid portion, thereby suppressing the movement in the axial direction.

DETAILED DESCRIPTION OF THE INVENTION

Then, the invention will be explained with reference to FIGS. 1–21.

FIGS. 1–13 show a tape cassette receiving housing of the first embodiment.

Figure 1:
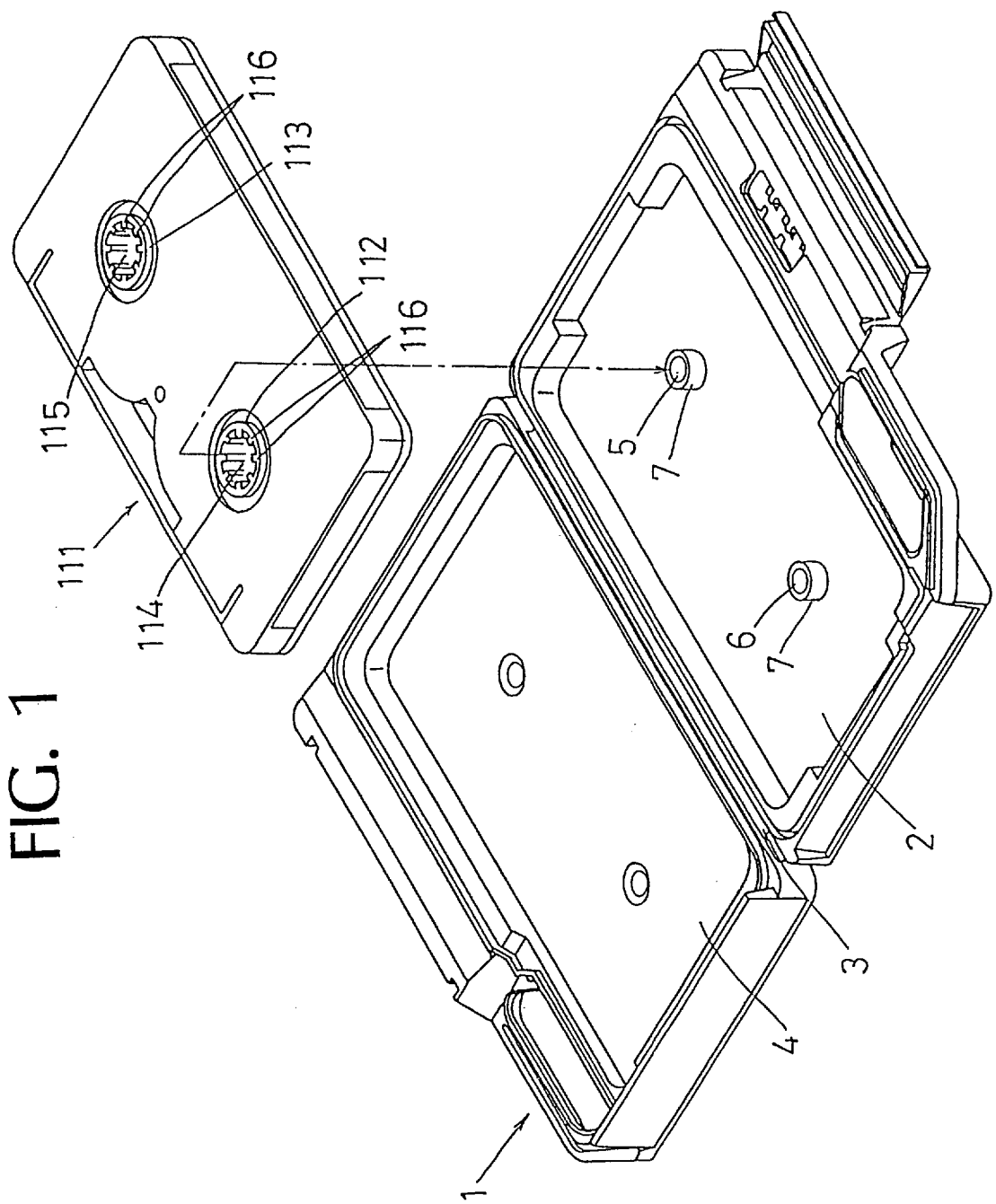
FIG. 1 is a perspective view of a first embodiment.

FIG. 1 is a perspective view in a condition that the lid of the tape cassette receiving housing is opened.

A tape cassette receiving housing 1 is equipped with a housing proper portion 2 which receives a tape cassette 111 and made of plastic, a lid portion 4 which is attached to a side portion of the housing proper portion 2 through a thin-thickness hinge portion 3, and a pair of cylindrical shaft portions (engaging projection portions) 5, 6 for positioning a cassette, which shaft portions are formed on an upper surface of the housing proper portion 2.

The shaft portions 5, 6 have elastic bodies 7 which are brought into a close contact with inner peripheral surfaces of the reel driving holes 114, 115 when the shaft portions 5, 6 are inserted into reel driving holes 114, 115 of the tape cassette 111.

Figure 3:
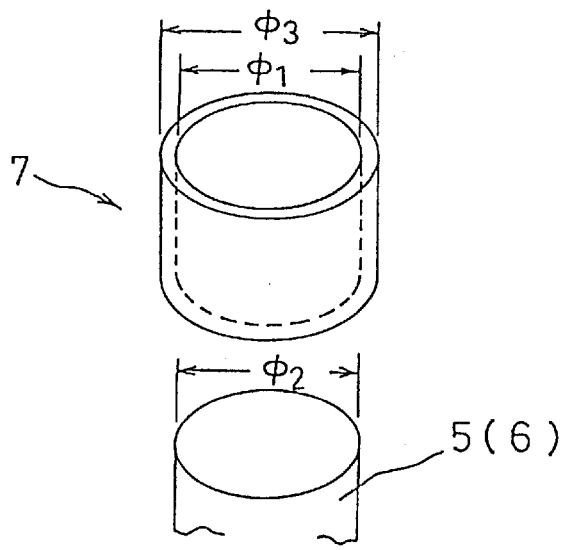
FIG. 3 is a perspective view of the elastic body.

The elastic body 7 is an elastic material such as rubber, plastic or the like as shown in FIG. 3, and is formed in a cylindrical shape and generally the same in length as the length (height) of the shaft portions 5, 6.

An inner diameter $\phi_1$ of the cylindrical elastic body 7 is the same as or slightly smaller than an outer diameter $\phi_2$ of the shaft portions 5, 6.

Furthermore, an outer diameter $\phi_3$ of the cylindrical elastic body 7 is formed so as to be slightly larger than an inner diameter of the reel driving holes 114, 115 of the tape cassette 111.

The cylindrical elastic bodies 7 are fixed under a condition that they are forced into an outer periphery of the shaft portions 5, 6.

Figure 2:
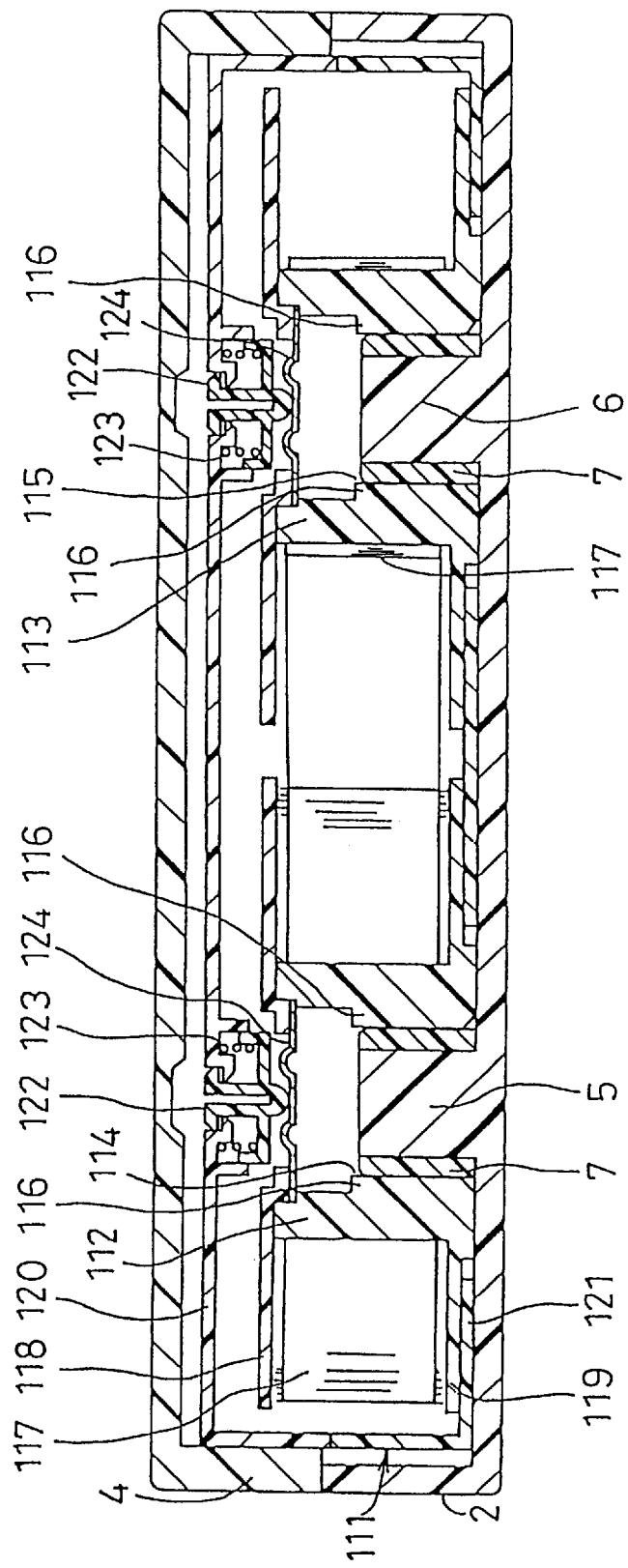
FIG. 2 is a sectional view of the first embodiment.

Furthermore, when the tape cassette 111 is inserted into the housing proper portion 2, as shown in FIG. 2, the shaft portions 5, 6 penetrate into the reel driving holes 114, 115 of the tape cassette 111 and outer peripheral surfaces of the elastic bodies 7 are brought into a close contact with inner peripheral surfaces of the reel driving holes 114, 115.

Therefore, even when a tape cassette receiving housing is dropped by mistake and a force for moving the tape cassette 111 in an axial direction of the shaft portions 5, 6 is added by a impact force upon falling or the like, the movement of the tape cassette 111 in an axial direction of the shaft portions 5, 6 is suppressed by a frictional resistance between the members and the rotation of the supply reel and the take-up reel of the tape cassette 111 is suppressed.

FIGS. 4–13 show modified examples of the elastic body 7.

Figure 4:
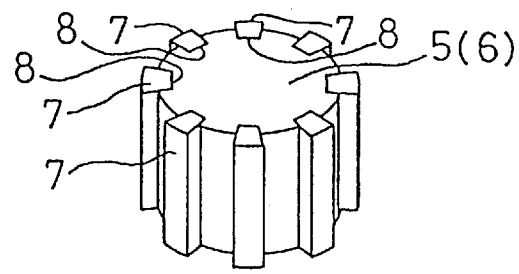
FIG. 4 is a perspective view of a modified example of the elastic body.

A modified example of FIG. 4 shows a case that the elastic body 7 is formed so as to have a form of ribs (rods).

The elastic bodies 7 in the form of ribs are attached to notched grooves 8 . . . 8 which are radially formed on the outer peripheral surfaces of the shaft portions 5, 6, and outer surfaces of the elastic bodies 7 . . . 7 in the form of ribs, which are attached to these notched grooves 8 . . . 8, are to be in contact with inner peripheral surfaces of the reel driving holes 114, 115.

Figure 5:
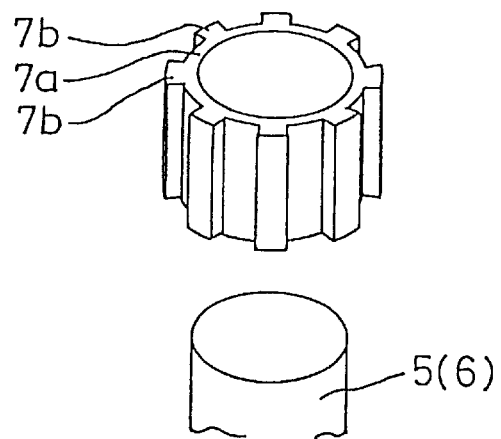
FIG. 5 is a perspective view of a modified example of the elastic body.

A modified example of FIG. 5 shows a case that the elastic body 7 comprises a cylindrical portion 7a and projection portions 7b . . . 7b which are formed, in the axial direction, on an outer peripheral surface of the cylindrical portion 7a.

The elastic body 7 is attached to the shaft portion 5, 6 by the use of the cylindrical portion 7a, and outer peripheral surfaces of the projection portions 7b . . . 7b which are radially projectingly formed on the outer peripheral surface of the cylindrical portion 7a are to be in contact with the inner peripheral surface of the reel driving hole 114, 115.

Figure 6:
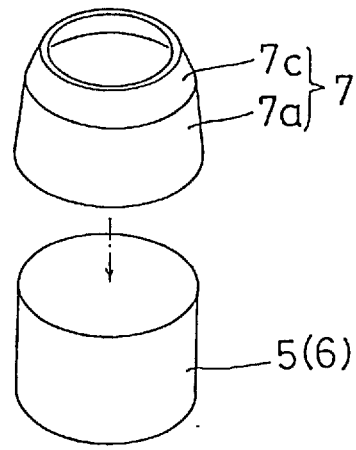
FIG. 6 is a perspective view of a modified example of the elastic body.

A modified example of FIG. 6 shows a case that the elastic body 7 is formed in the form of a so-called cap by a cylindrical portion 7a and a truncated cone portion 7c which is formed so as to be connected to the upper end of the cylindrical portion 7a.

Furthermore, the elastic body 7 is to be attached to the shaft portion 5, 6 in a manner to put a cap thereon.

Figure 7:
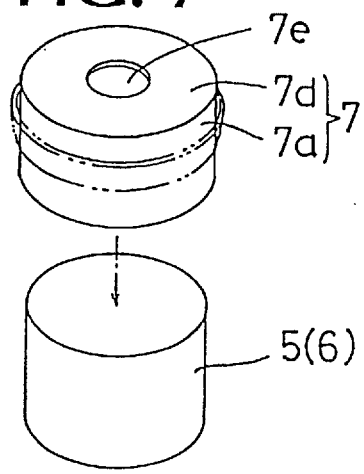
FIG. 7 is a perspective view of a modified example of the elastic body.

A modified example of FIG. 7 shows a case that the elastic body 7 is formed with a cylindrical portion 7a and an upper surface plate 7d which is formed so as to cover the upper end of the cylindrical portion 7a.

A hole 7e for removing air is formed at a center portion of the upper surface plate 7d.

Figure 8:
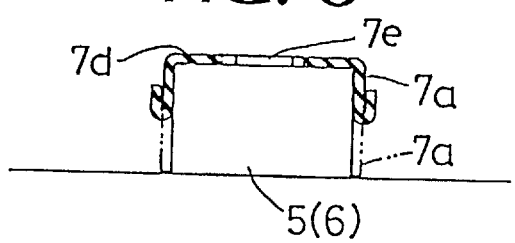
FIG. 8 is a sectional view showing an attached condition of the elastic body.

Furthermore, as is shown in FIG. 8, the lower end of the cylindrical portion 7a is outwardly folded, then the cylindrical portion 7a is put on the shaft portion 5, 6, and then the folded portion is unfolded to thereby attach the elastic body 7 to the shaft portion 5, 6.

Figure 9:
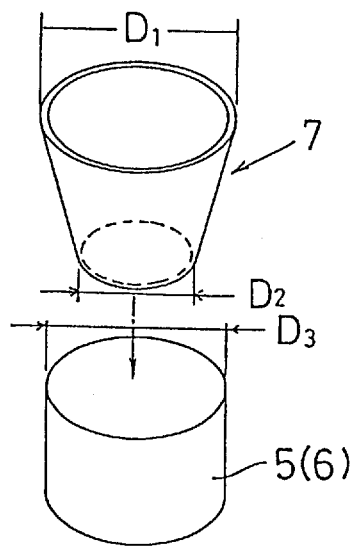
FIG. 9 is a perspective view of a modified example of the elastic body.

A modified example of FIG. 9 shows a case that the elastic body 7 is formed in the form of a truncated cone with opened upper and lower ends.

A diameter $D_1$ of an opened portion on the upper end side of the elastic body 7 with a truncated cone shape is larger than a diameter $D_2$ of an opened portion of the lower end side, and it is a so-called inverse truncated-cone in shape.

The diameters $D_1$ and $D_2$ of the opened portions on the upper and lower sides are smaller than a diameter $D_3$ of the shaft portion 5, 6.

Figure 10:
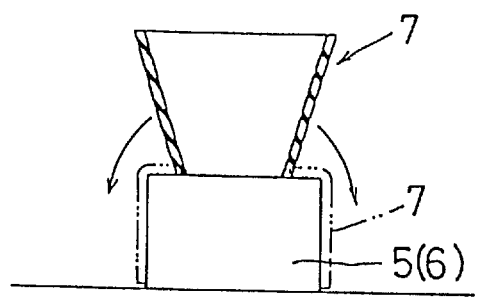
FIG. 10 is a sectional view showing an attached condition of the elastic body.

Furthermore, as is shown in FIG. 10, the opened portion on the lower end side of the elastic body 7 is brought into abutment with an upper surface of the shaft portion 5, 6, and then the opened portion of the upper end side is put on a peripheral surface of the shaft portion 5, 6 in a manner to fold the opened portion of the upper end side to thereby attach the elastic body 7 to the shaft portion 5, 6.

Figure 11:
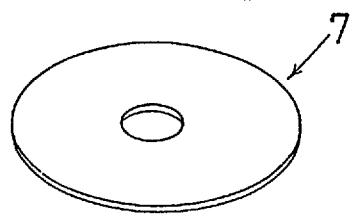
FIG. 11 is a perspective view of a modified example of the elastic body.

A modified example of FIG. 11 shows that the elastic body 7 is formed by punching an elastic sheet to get a ringlike shape.

Figure 12:
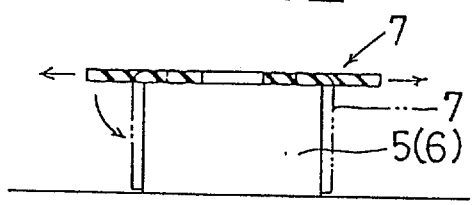
FIG. 12 is a sectional view showing an attached condition of the elastic body.

Furthermore, as is shown in FIG. 12, the ringlike elastic body 7 is put on and attached to the shaft portion 5, 6 while the elastic body 7 is stretched.

Figure 13:
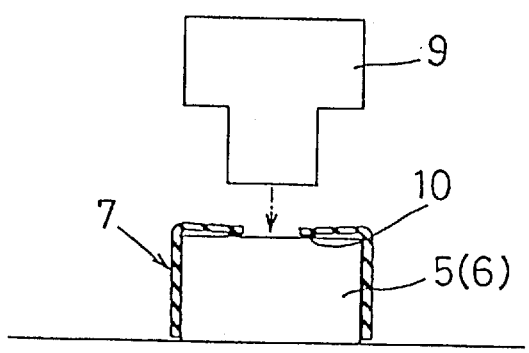
FIG. 13 is a sectional view showing a welded condition of the elastic body.

FIG. 13 shows a case that an upper portion of an elastic body 7 attached to the shaft portion 5, 6 is welded to the shaft portion 5, 6 with heat or an ultrasonic welding machine 9 to thereby prevent the elastic body 7 from coming off the shaft portion 5, 6. 10 is a welding portion.

Figure 14:
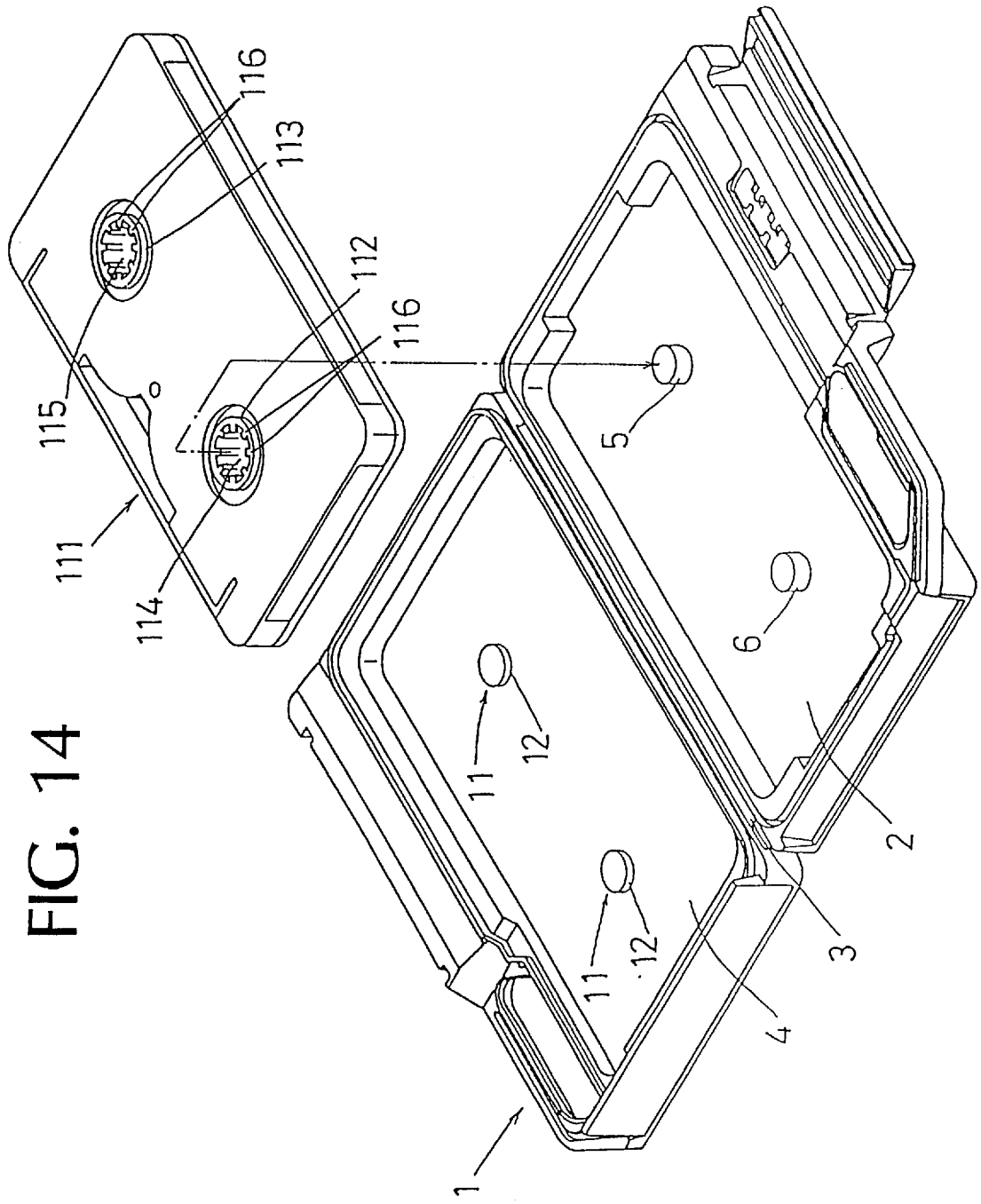
FIG. 14 is a perspective view of a second embodiment.
Figure 15:
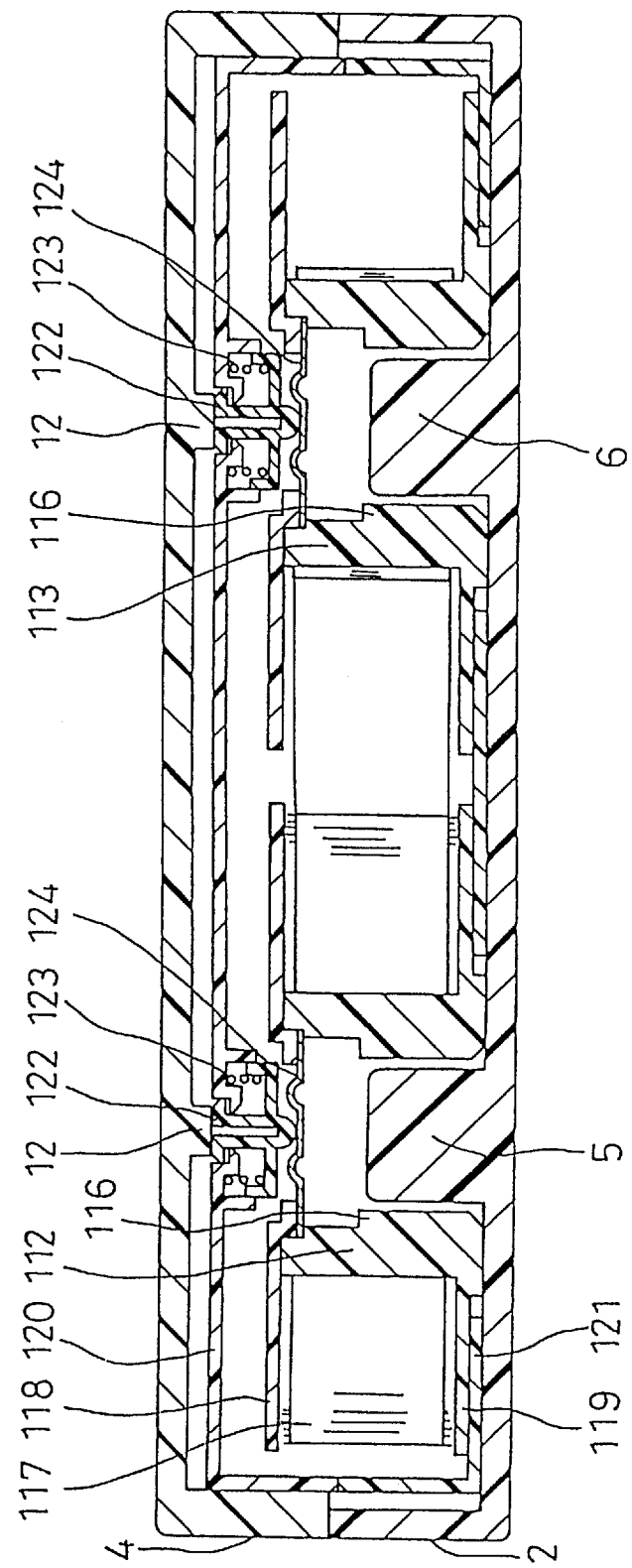
FIG. 15 is a sectional view of the second embodiment.

FIGS. 14–15 show a tape cassette receiving housing of another embodiment of the present invention.

In this embodiment, a tape cassette receiving housing 1 is equipped with a housing proper portion 2 which receives a tape cassette 111 and made of plastic, a lid portion 4 which is attached to a side portion of the housing proper portion 2 through a thin-thickness hinge portion 3, and a pair of cylindrical shaft portions 5, 6 which are formed on an upper surface of the housing proper portion 2, and a cassette pressing member 11 for pressing an upper shell or a lower shell of a tape cassette 111 received in the housing proper portion 2 against an inner surface of the housing proper portion 2 or the lid portion 4 (the second invention).

The cassette pressing members 11 are formed with a pair of reel holder pressing members 12, 12 which press the reel holders 122, 122 of the tape cassette 111 against an inner surface of the lid portion 4 when the lid portion is closed.

The above pair of reel holder pressing members 12 are formed so as to be integral with the lid portion 4 by projecting portions (positions corresponding to the reel holders 122, 122 of the supply reel 112 and the take-up reel 113 of the tape cassette 111 received in the housing proper portion 2) of the inner surface of the lid portion 4.

Furthermore, when the tape cassette is received in the housing proper portion 2 and then the lid portion is closed, as is shown in FIG. 15, the reel holder pressing members 12, 12 formed on the lid portion 4 press the reel holders 122, 122 of the tape cassette 111.

When the reel holders 122, 122 are pushed down, the supply reel 112 and the take-up reel 113 are pushed down through the reel spring 123 and the reel plate 124, and the lower shell 121 is pushed down through these reels 112, 113. With this, lower surfaces of the supply reel 112 and the take-up reel 113 and the lower shell 121 are pressed against the inner surface of the housing proper portion 2.

Therefore, when the tape cassette receiving housing is dropped by mistake and a force for moving the tape cassette 111 in an axial direction of the shaft portions 5, 6 is added, a pressing force by the reel holders 122, 122 prevents the tape cassette 111 from moving in the axial direction of the shaft portions 5, 6.

Figure 16:
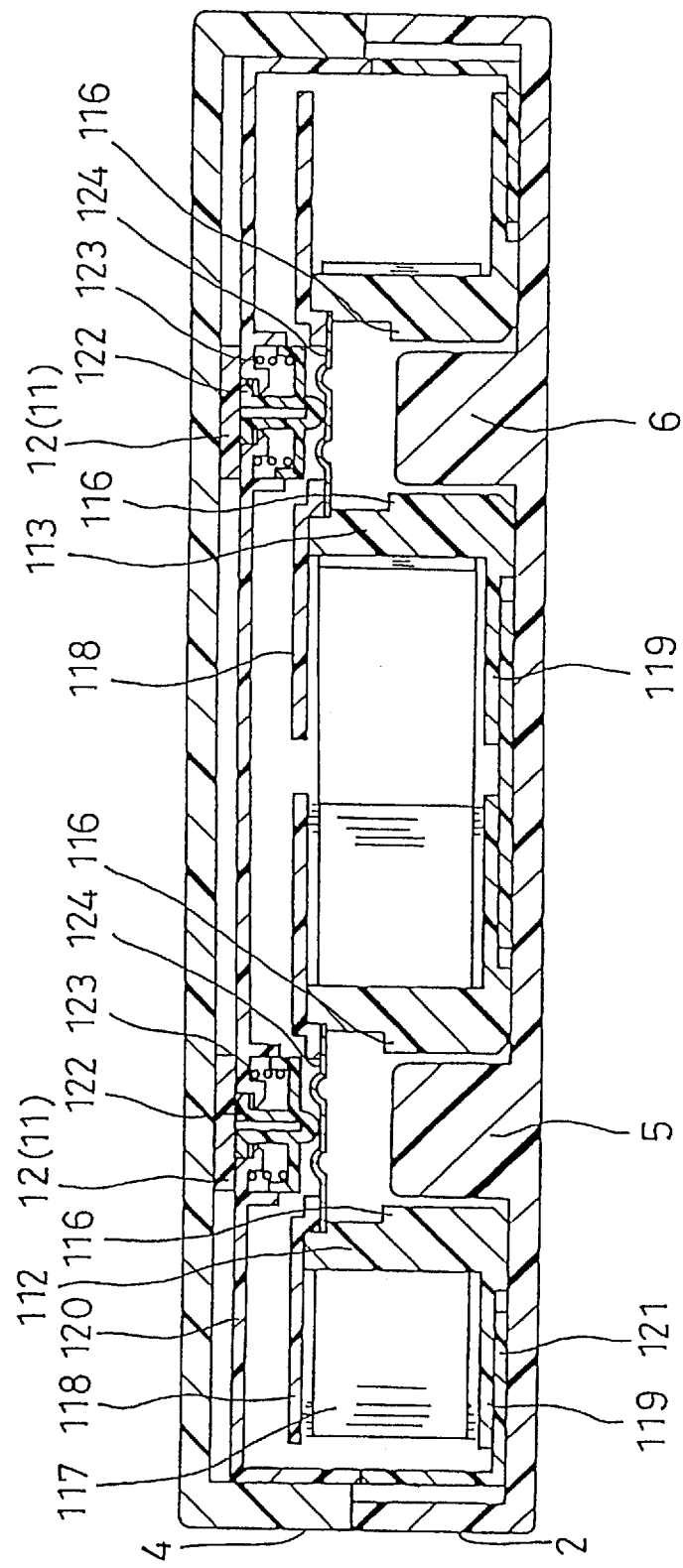
FIG. 16 is a sectional view of a third embodiment.

FIG. 16 shows a tape cassette receiving housing of another embodiment.

In this embodiment, the reel holder pressing member 12 is made in the form of a plate with an elastic material such as rubber and plastic and attached to the inner surface of the lid portion 4.

Thus, when an impact force of at least a predetermined value acts on the reel holder 122 upon falling or the like, the reel holder pressing member 12 is compressed, acts as a so-called shock absorbing material, and prevents a breaking accident of the reel holder 122 or the like.

Figure 17:
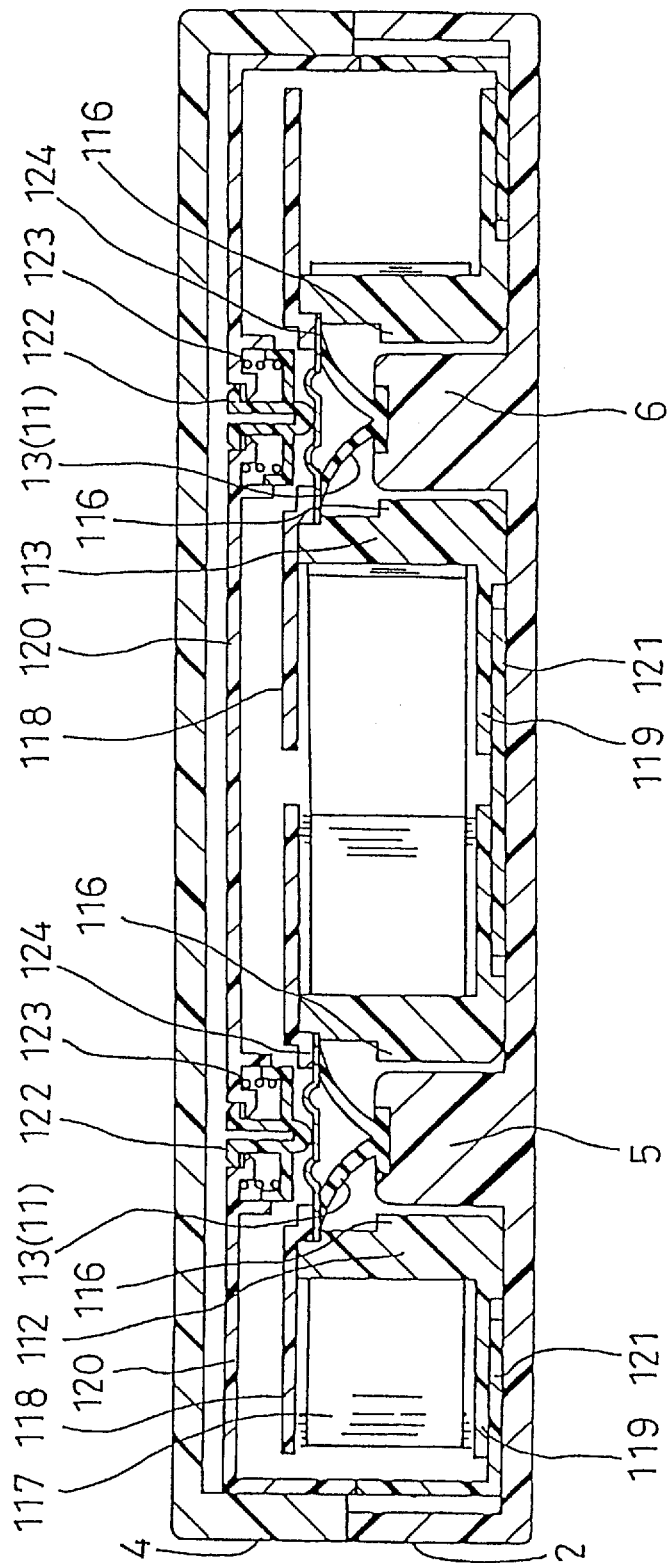
FIG. 17 is a sectional view of a fourth embodiment.

FIG. 17 shows a tape cassette receiving housing of another embodiment of the present invention.

In this embodiment, the cassette pressing member 11 is constituted by forming a sucker 13 which is formed on the housing proper portion 2 side and sucks the tape cassette received in the housing proper portion 2 toward the housing proper portion 2 side.

The sucker 13 is made of a soft synthetic resin, hornlike in shape, and attached to the upper surface of the shaft portion 5, 6.

Thus, when the tape cassette is received in the housing proper portion 2 and then the lid portion 4 is closed, the reel plate 124 of the tape cassette 111 is pressed against the sucker 13 and air between the sucker 13 and the reel plate 124 is removed. With this, a so-called reduced pressure condition is obtained so that the reel plate 124 is adhered to by the sucker 13.

Thus, lower surfaces of the supply reel 112 and the take-up reel 113 and the lower shell 121, of which reel plate 124 is suctioned to the sucker 13, are pressed against the inner surface of the housing proper portion 2.

Therefore, similar to the previous embodiments, even when, for example, the tape cassette is dropped by mistake and a force for moving a tape cassette in an axial direction of the shaft portions 5, 6 is added, the movement of the tape cassette in an axial direction of the shaft portions 5, 6 is prevented.

Figure 18:
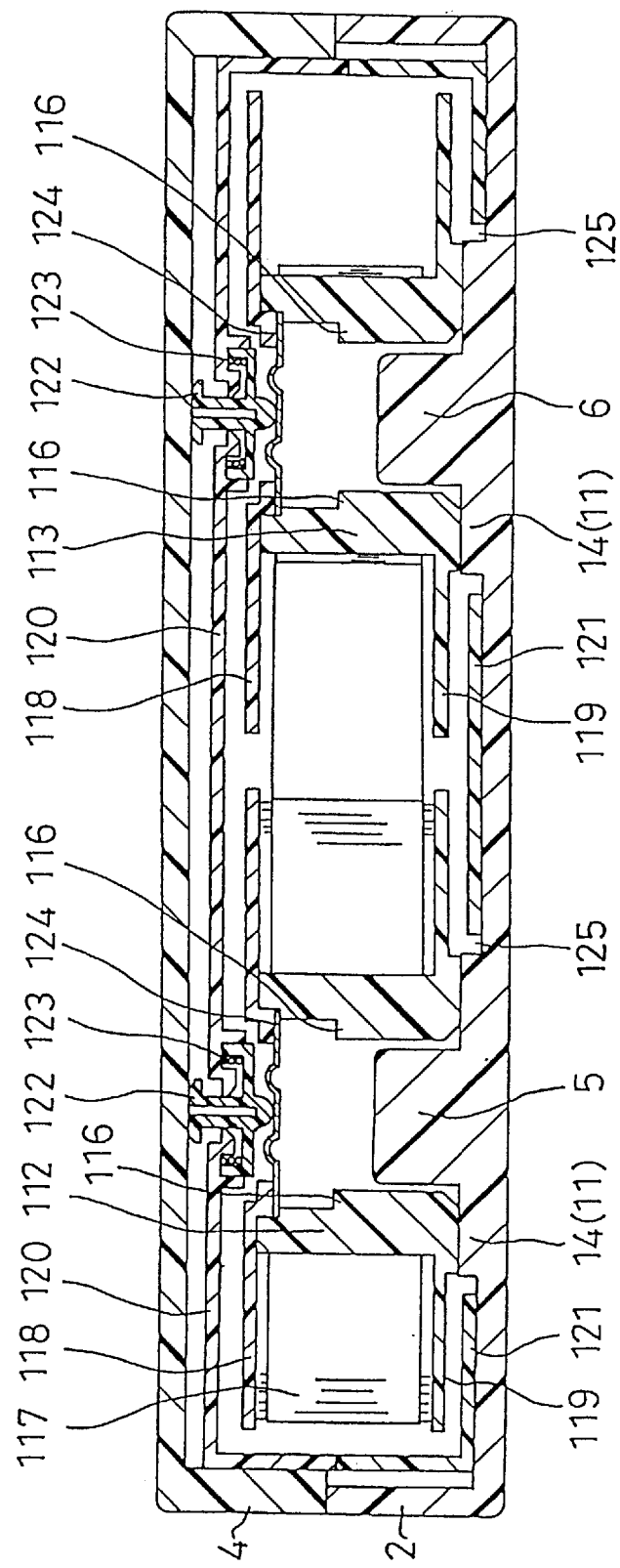
FIG. 18 is a sectional view of a fifth embodiment.

FIG. 18 shows a tape cassette receiving housing of another embodiment of the present invention.

In this embodiment, the cassette pressing member 11 is constituted by projectingly forming a seating portion 14 for placing a reel thereon, which lifts up the supply reel 112 and the take-up reel 113 of the tape cassette 111 received in the housing proper portion 2 toward the upper shell 120 side, on the inner surface of the housing proper portion 2.

The seating portion 14 is circularly formed on the outer peripheral portion of the shaft portion 5, 6.

The diameter of the seating portion 14 is slightly smaller than the diameter of a reel base introducing hole 125 formed on the lower shell 121.

Thus, when the tape cassette 111 is received in the housing proper portion 2, the supply reel 112 and the take-up reel 113 are placed on the seating portions 14, 14 formed on the outer peripheral portions of the shaft portions 5, 6 and these supply reel 112 and the take-up reel 113 are lifted up toward the upper shell 120 side.

When the supply reel 112 and the take-up reel 113 are lifted up, the reel plates 124 attached to these supply reel 112 and the take-up reel 113 are also lifted up.

When the reel plate 124 is lifted up, the reel holder 122 is pressed and raises against the spring force of the reel spring 123 and a head portion of the reel holder 122 projects from the upper surface of the upper shell 120.

Therefore, when the lid portion 4 is closed, the head portion of the reel holder 122 is brought into contact with an inner surface of the lid portion 4 and the upper shell becomes pressed against the inner surface of the lid portion 4.

Figure 19:
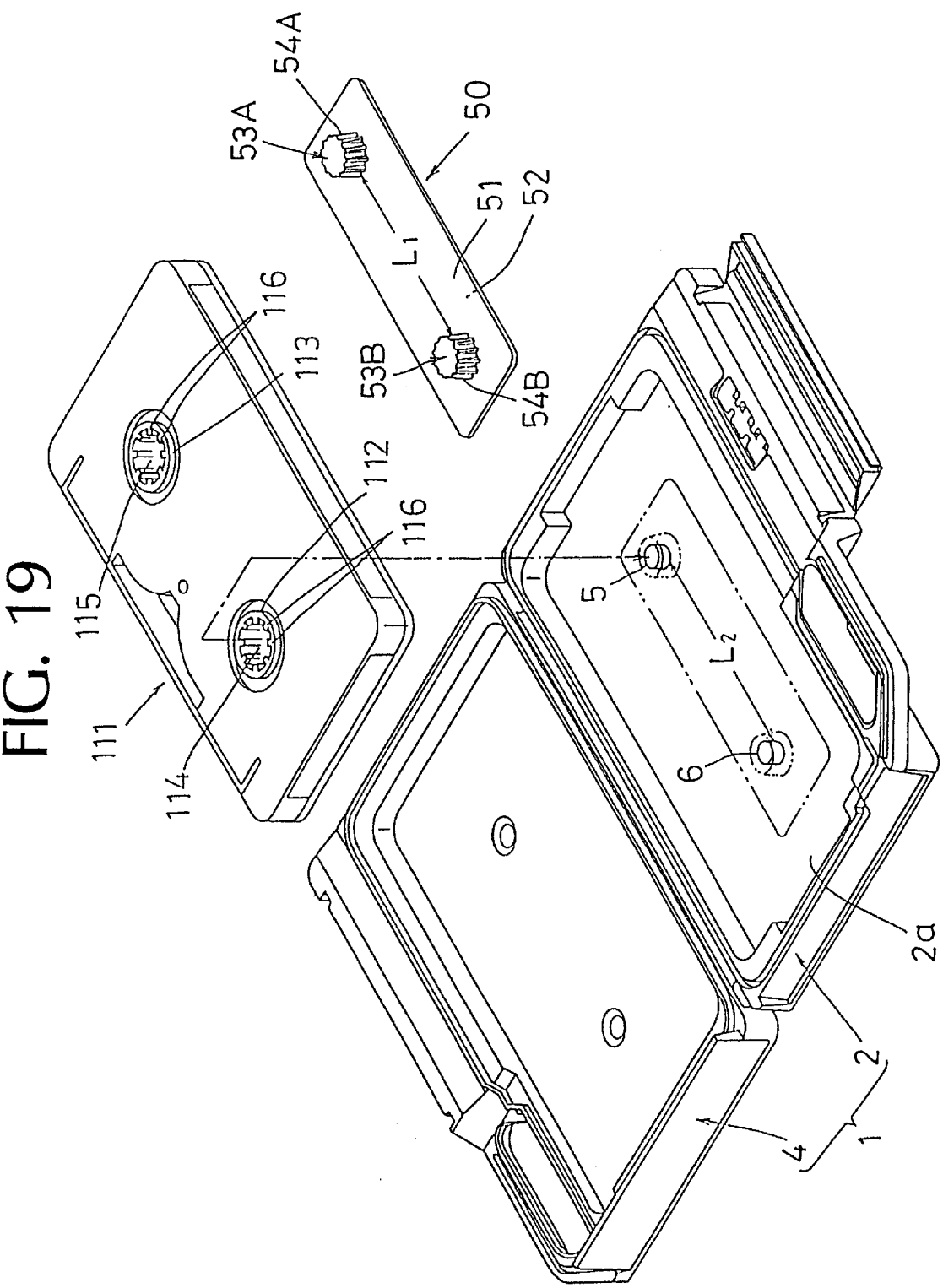
FIG. 19 is a perspective view of a sixth embodiment.

Therefore, similar to the cases of the previous embodiments, even when the tape cassette receiving housing is dropped by mistake and a force for moving the tape cassette in an axial direction of the shaft portions 5, 6 is added, the tape cassette is prevented from moving in the axial direction. FIG. 19 shows a tape cassette receiving housing of another embodiment of the present invention.

According to this embodiment, the tape cassette receiving housing 1 is equipped with the housing proper portion 2 for receiving the tape cassette 111, the lid portion 4 for opening or closing an opening portion of the housing proper portion 2, the shaft portions 5, 6 which are formed on the housing proper portion 2 and penetrate into the reel driving holes 114, 115 of the tape cassette 111 received in the housing proper portion 2, and a tape reel idle-rotation limiting member 50 for covering the shaft portions 5, 6, which have cylindrical idle-rotation limiting portions 53A, 53B formed thereon projectingly with engaging projections portions 54A, 54B for engaging therewith the driving ribs 116 of the reel driving holes 114, 115, and is formed by putting the tape reel idle-rotation limiting member 50 between the bottom surface of the housing proper portion 2 and the received tape cassette 111.

The idle-rotation limiting member 50 is made of a vacuum-formable synthetic resin such as a vinyl chloride resin, a polypropylene resin or the like; its base portion is laterally long rectangular sheetlike in shape; and a pair of idle-rotation limiting portions 53A, 54B are projectingly formed on one major surface 51 side so as to be spaced from each other in a longitudinal direction. The dimension of this idle-rotation limiting member 50 in a longitudinal direction is slightly smaller than the width of a cassette receiving cavity portion 2a of the housing proper portion 2. Furthermore, as will be described hereinafter, under a condition that this idle-rotation limiting member 50 is attached to the housing proper portion 2, the other major surface 52 which is to be engaged with the bottom surface portion of the cassette receiving cavity portion 2a is formed with a rough surface, although not shown in the drawing. Thus, the major surface (engaging surface) 52 in relation to the bottom surface portion of the cassette receiving cavity portion 2a is formed with a rough surface. With this, the contact resistance becomes large.

Figure 20:
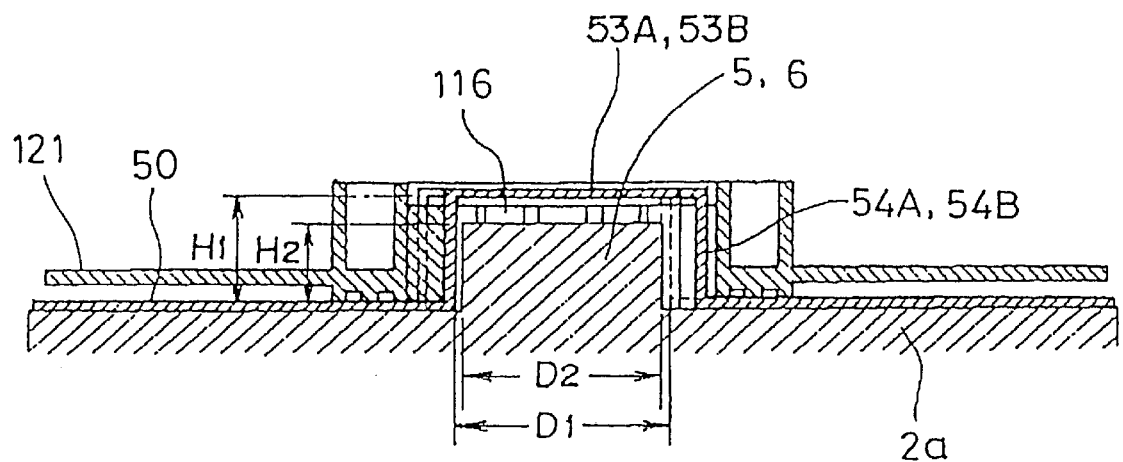
FIG. 20 is a vertically sectional view of an essential portion in a condition that a tape reel idle-rotation limiting member of the sixth embodiment is attached.

The distance L1 between the idle-rotation limiting portions 53A, 53B which are projectingly formed on the idle-rotation limiting member 50 is made generally the same as the distance L2 between the shaft portion 5, 6 which are projectingly formed on the bottom surface portion of the cassette receiving cavity portion 2a. Furthermore, these idle-rotation limiting portions 53A, 53B are formed so as to be generally cylindrical in shape, and, as shown in FIG. 20, each height H1 is somewhat larger than a height H2 of the shaft portion 5, 6 and an inner diameter D1 is slightly larger than an outer diameter D2 of the shaft portions 5, 6.

Furthermore, on the outer peripheral surface of the idle-rotation limiting portions 53A, 53B, gear-like engaging projection portions 54A, 54B which correspond to gear-like driving ribs 116 . . . 116 formed respectively on inner peripheral surfaces of the reel driving holes 114, 115 of the supply reel 112 so as to cover their entire periphery are projectingly integrally formed respectively so to cover the entire periphery. Thus, for the purpose of projectingly forming on the sheetlike base portion the idle-rotation limiting portions 53A, 53B on which outer peripheral surfaces the engaging projection portions 54A, 54B are projectingly formed, they are formed on the idle-rotation limiting member 50 by a vacuum forming method.

The thus constructed idle-rotation limiting member 50 is attached on the bottom surface portion of the cassette receiving cavity portion 2a so as to respectively cover the shaft portions 5, 6 with the idle-rotation limiting portions 53A, 53B, as shown by a chain line in FIG. 19, when the tape cassette 111 received in the tape cassette receiving housing 1 is carried. Thus, the tape cassette 111 which is to be received in the cassette receiving cavity portion 2a having the idle-rotation limiting member 50 attached thereon is positioned by fitting the shaft portions 5, 6 into the reel driving holes 114, 115 of the supply reel 112 and the take-up reel 113.

Figure 21:
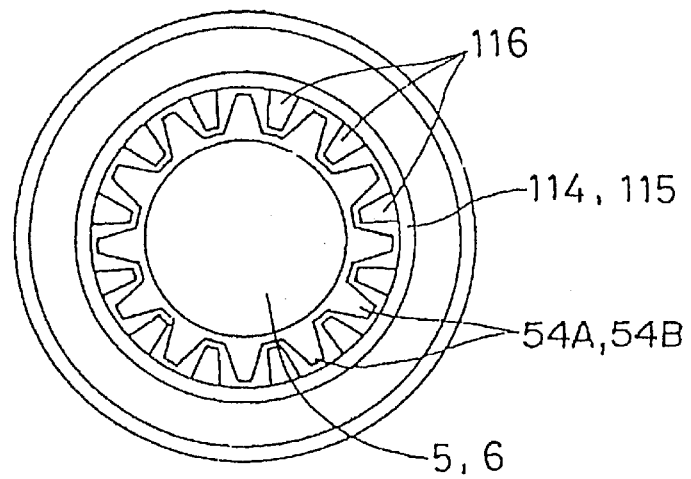
FIG. 21 is a plan view of the essential portion shown by sectioning a roof surface of an idle rotation limiting portion of the tape reel idle-rotation limiting member in the condition of FIG. 20.
Figure 22:
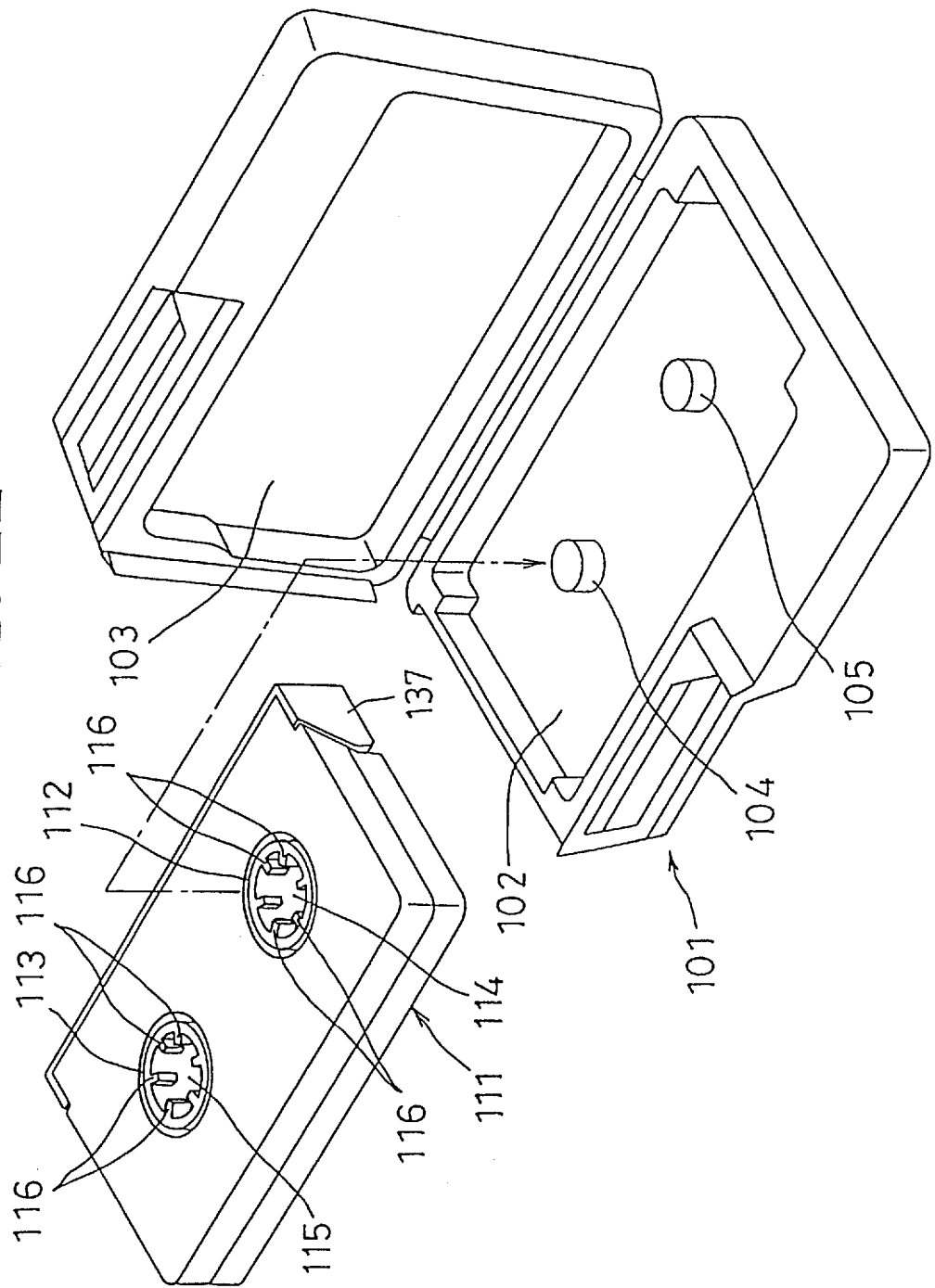
FIG. 22 is a perspective view of a conventional example.
Figure 23:
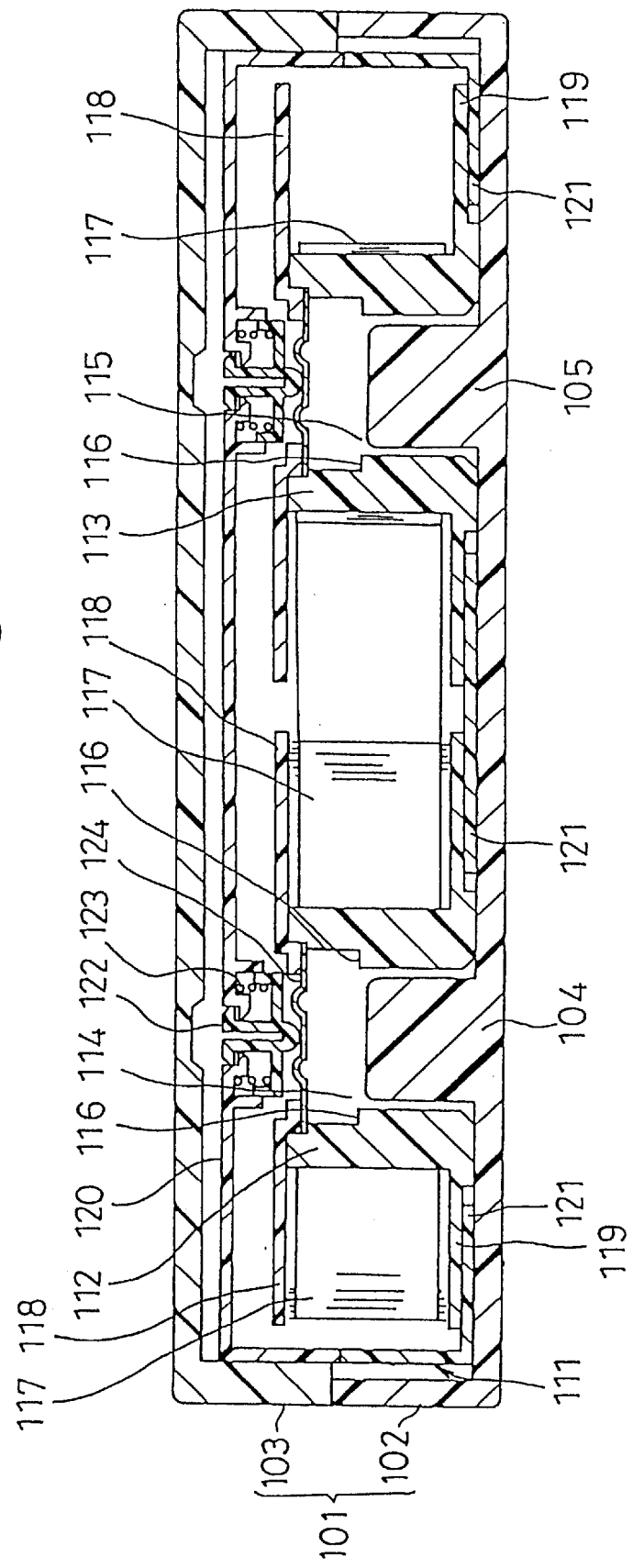
FIG. 23 is a sectional view of the conventional example.
Figure 24:
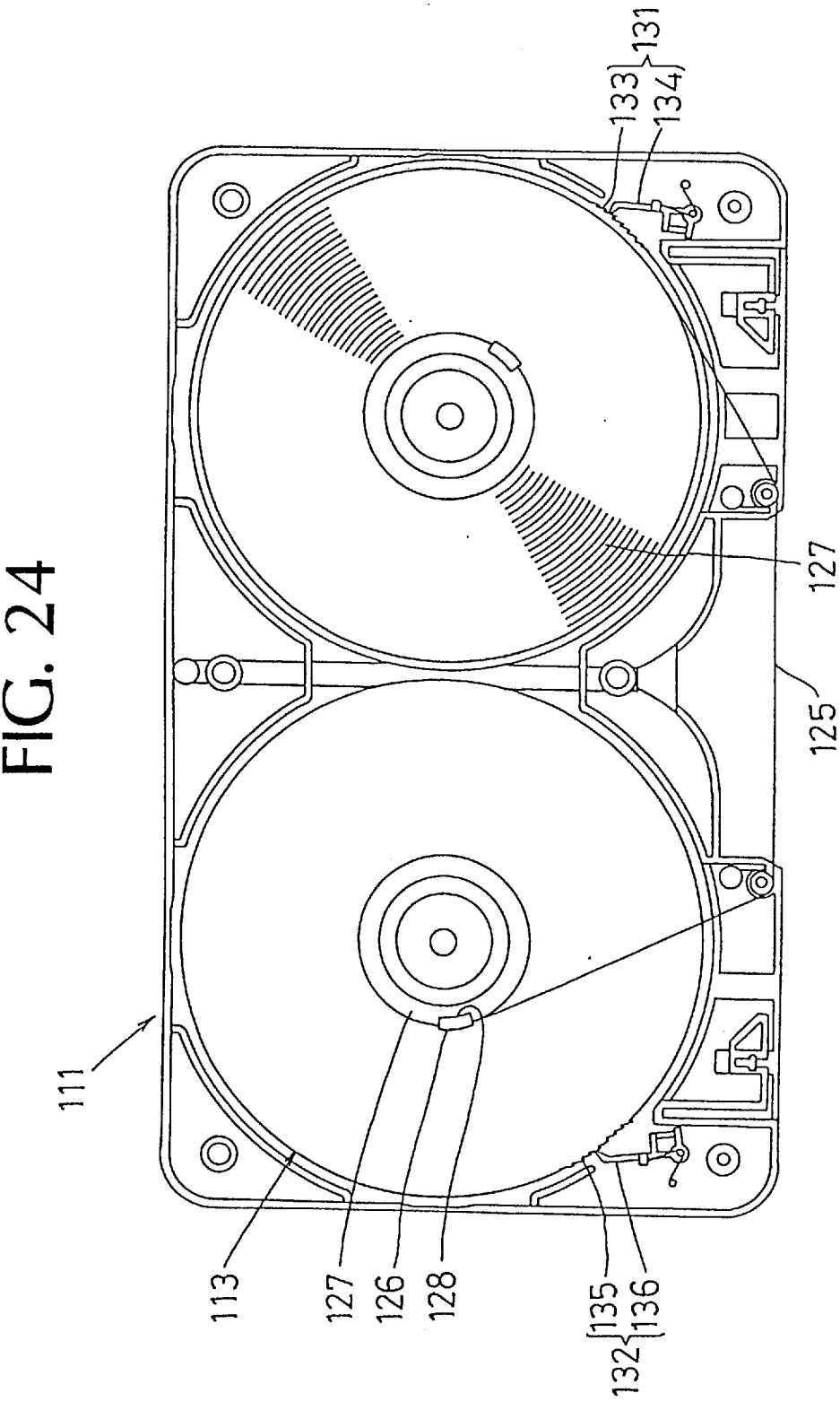
FIG. 24 is a plan view showing an interior of a tape cassette.
Figure 25:
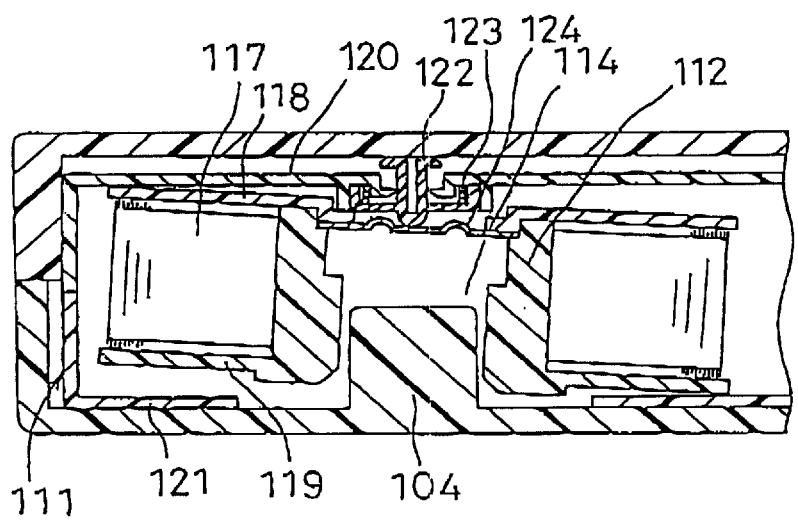
FIG. 25 is a sectional view showing problems of the conventional example.

Furthermore, by putting thereon the idle-rotation limiting portions 53A, 53B, the engaging projection portions 54A, 54B are projectingly formed on the outer peripheral portions of the shaft portions 5, 6 so as to cover the entire periphery, and, as shown in FIG. 21, these engaging projection portions 54A, 54B are engaged with the gear-like driving ribs 116 . . . 116 which are formed so as to cover the entire periphery of the reel driving holes 114, 115 of the supply reel 112 and the take-up reel 113.

As is mentioned hereinabove, an intermittent vibration or the like is added to the received tape cassette 111 by carrying the tape cassette receiving housing 1. By this intermittent vibration or the like, the supply reel 112 and the take-up reel 113 having different moments of inertia due to different amounts of wound magnetic tape 117 receives a pulling force in the delivery direction intermittently and alternately. However, the engaging projection portions 54A, 54B of the idle-rotation stopping portions 53A, 53B which are projectingly formed on the idle-rotation limiting member 50 are engaged with the rotation-stopping rib portions 114a, 115a. Therefore, the idle movement in a rotational direction of the supply reel 112 and the take-up reel 113 is assuredly limited, and thus the idle rotation is impossible.

Therefore, the idle movement of the supply reel 112 or the take-up reel 113 in either the delivery direction or the take-up direction of the magnetic tape 117 is assuredly stopped by the idle movement stopping action in the rotational direction through the above-mentioned idle-rotation limiting member 50. With this, the occurrence of the cinching phenomenon at the supply reel 112 is prevented, and the clamper 126 at the take-up reel 113 is also prevented from coming off.

In this embodiment, the idle-rotation limiting member 50 which is equipped with the idle-rotation limiting portions 53A, 53B for covering the pair of shaft portions 5, 6 projectingly formed on the cassette receiving cavity portion 2a is interposed between the bottom surface portion of the cassette receiving cavity portion 2a and the tape cassette 111. However, the idle-rotation limiting portion 53A may be projectingly formed for covering either one of the shaft portions and more preferably the shaft portion which is to be fitted into the supply reel 112.

In this case, the driving ribs 116 . . . 116 of the reel driving holes 114, 115 and the engaging projection portions 54A are in an engaged condition and a rotational force is transmitted to the idle-rotation limiting member 50 too by vibration in the rotational direction of the reel caused by vibration or the like. However, this rotational force acts from the center side of the idle-rotation limiting member 50 and the bottom body portion is widely in contact with the bottom surface portion of the shaft portion 5. Therefore, the idle rotation of the idle-rotation limiting member 50, i.e. that of the supply reel 112, is impossible. Furthermore, the idle movement of the idle-rotation limiting member 50 is more assuredly prevented by making the lower major surface 52 side of the idle-rotation limiting member 50 rough, as is described hereinabove.

Furthermore, in this embodiment, a plurality of engaging projection portions 54A, 54B are projectingly formed so as to cover the entirety of the outer peripheral surface of the idle-rotation limiting portions 53A, 53B of the idle-rotation limiting member 50 which is to be interposed between the bottom surface portion of the cassette receiving cavity portion 2a and to be opposingly engaged with the gear-like driving ribs 116 . . . 116 of the reel driving holes 114, 115 formed on the supply reel 112 and the take-up reel 113. However, the number of this engaging projection portions 54A, 54B may not be the same as that of the driving ribs, and it may be one or the plural number.

Furthermore, the present invention is not limited to the above-mentioned large sized tape cassette receiving housing for business use which enables the digital recording, and may be applied to other large sized tape cassette receiving housings. In this case, the shape of the cassette receiving cavity portion or the shape of the shaft portions 5, 6 is suitably changed, and according to this, the shapes of the idle-rotation limiting member and the idle-rotation limiting portion are suitably changed.

We claim:

1. A tape cassette receiving housing comprising:
   a compartment portion for receiving a tape cassette;
   a lid portion for covering said compartment;
   at least one shaft portion having substantially smooth sides which penetrates into a reel driving hole on the tape cassette received in the housing; and
   an elastic member in close contact with an inside of said reel driving hole when said at least one shaft portion is inserted into the reel driving hole, wherein:
   said elastic body has a first portion and a second portion;
   said second portion is shaped as a truncated cone; and
   said first portion has an opening therein; and
   wherein said opening is circular and has a smaller diameter than a diameter of a larger end of said truncated cone.

2. A housing as claimed in claim 1 wherein said elastic member is disposed on said at least one shaft portion and runs substantially an entire axial length of said shaft portion.

3. A housing as claimed in claim 1, wherein:
   said shaft portion and said elastic member have a substantially cylindrical shape;
   said elastic member is disposed on said shaft portion; and
   an inner diameter of said elastic member is slightly smaller than an outer diameter of said shaft portion.

4. A tape cassette receiving housing, comprising:
   a compartment portion for receiving a tape cassette;
   a lid portion for covering said compartment;
   at least one shaft portion having substantially smooth sides which penetrates into a reel driving hole on the tape cassette received in the housing; and
   an elastic member in close contact with an inside of said reel driving hole when said at least one shaft portion is inserted into the reel driving hole, wherein:
   said elastic body has a substantially cylindrical shape, one end of which is substantially closed; and
   said substantially closed end of said cylindrical elastic body has an opening;
   wherein said opening is circular and has a smaller diameter than a diameter of said cylindrical elastic body; and
   wherein a portion of said cylindrical elastic body may be folded over another portion of said cylindrical elastic body to facilitate installation of the elastic body on said at least one shaft portion.

5. A tape cassette receiving housing comprising:
   a compartment portion for receiving a tape cassette;
   a lid portion for covering said compartment;
   at least one shaft portion having substantially smooth sides which penetrates into a reel driving hole on the tape cassette received in the housing; and
   an elastic member in close contact with an inside of said reel driving hole when said at least one shaft portion is inserted into the reel driving hole;
   wherein said elastic body is shaped as a truncated cone having a first diameter at one end which is smaller than a second diameter at an opposite end;
   wherein said first diameter is smaller than a diameter of said shaft portion; and
   wherein said end of said elastic body having said first diameter is positioned in abutment with an end of said shaft portion and said elastic body is folded over said shaft portion.

* * * * *